Nov. 25, 1969  S. D. POOL ET AL  3,479,806
INERTIA SHAKER CONSTRUCTION
Filed Aug. 30, 1965  2 Sheets-Sheet 1
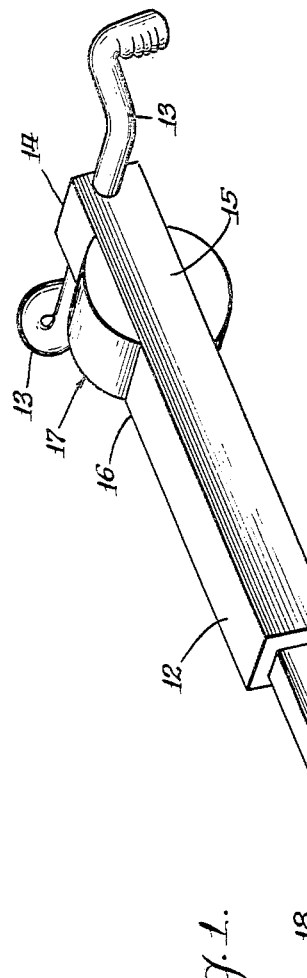
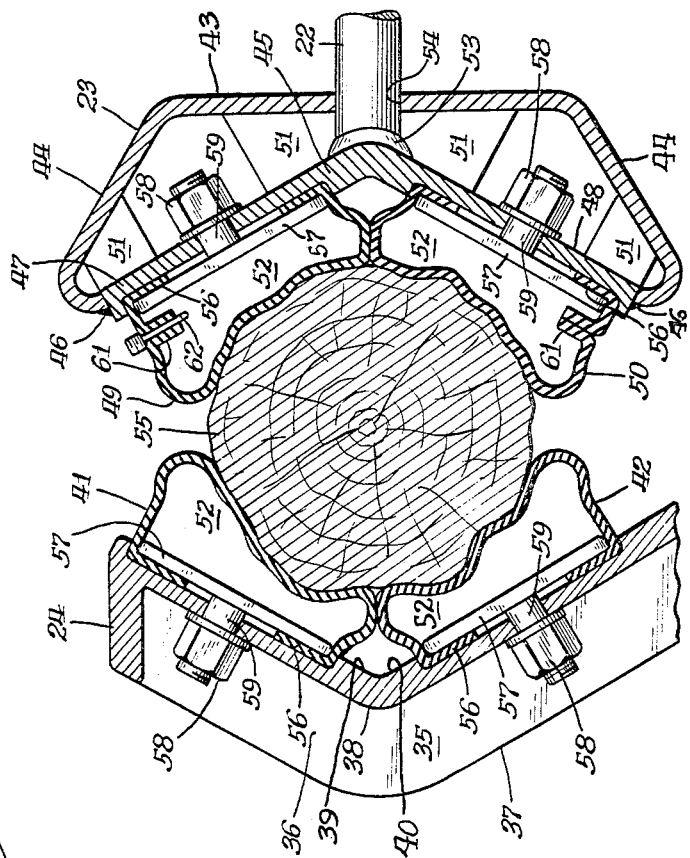
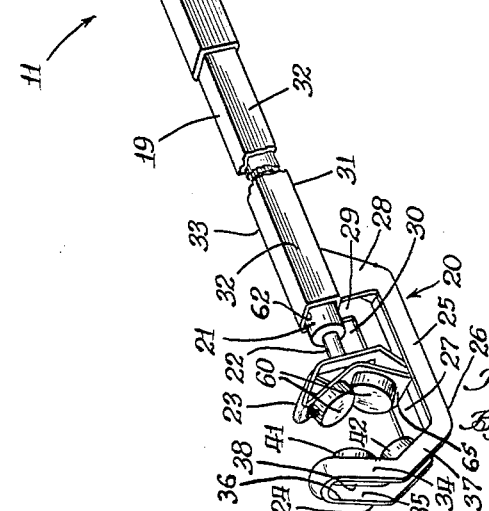
Inventors.
Stuart D. Pool
Richard R. Steingas
By John J. Kowalik
Atty.

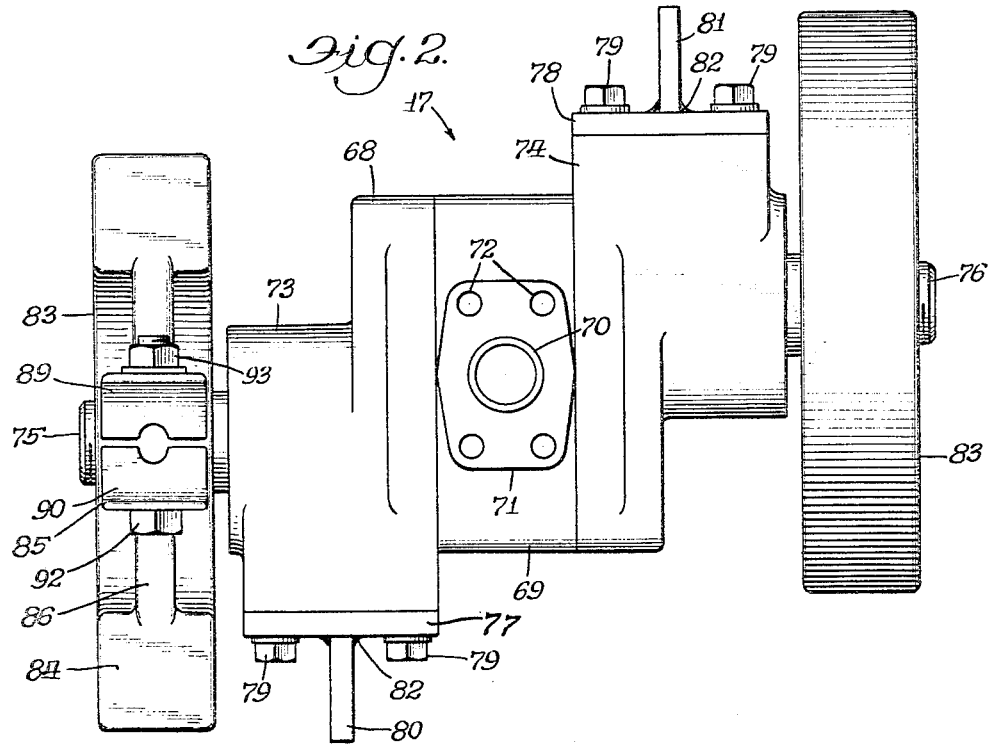
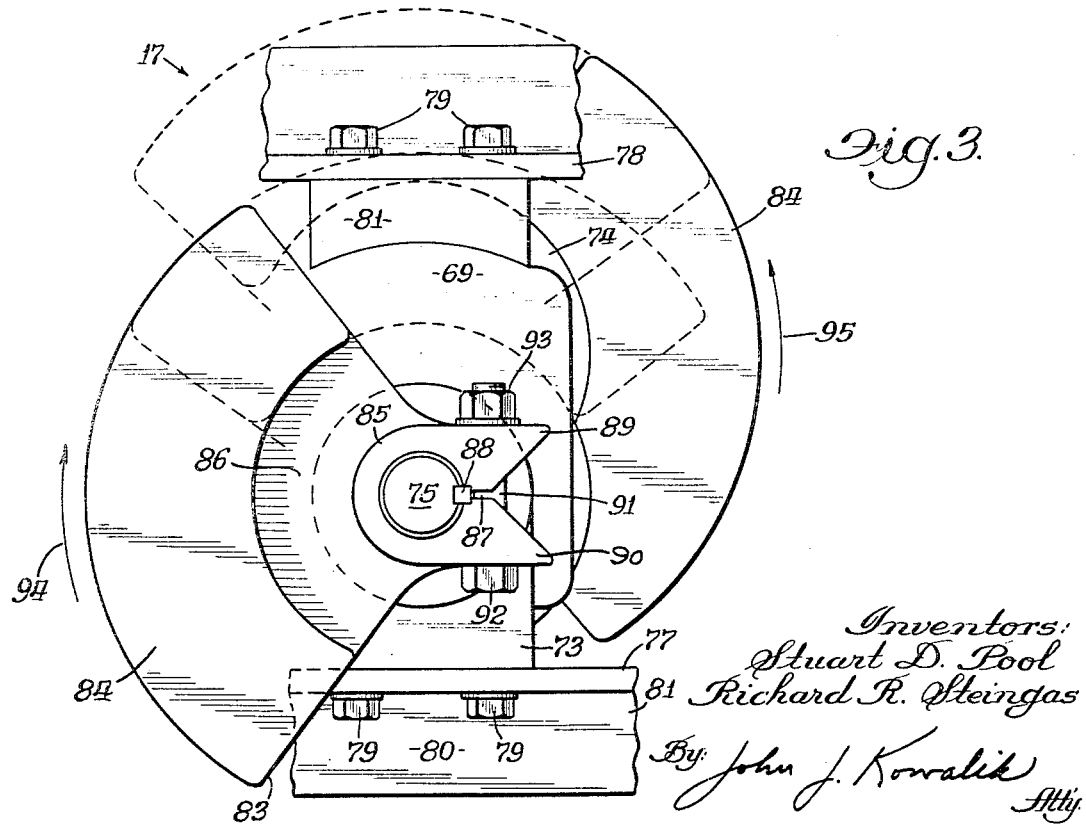

United States Patent Office 3,479,806
Patented Nov. 25, 1969

3,479,806
INERTIA SHAKER CONSTRUCTION
Stuart D. Pool and Richard R. Steingas, Naperville, Ill., assignors to International Harvester Company, Chicago, Ill., a corporation of Delaware
Filed Aug. 30, 1965, Ser. No. 483,474
Int. Cl. A01g 19/00; F16h 27/04
U.S. Cl. 56—328                                                   1 Claim

ABSTRACT OF THE DISCLOSURE

A tree shaker apparatus including an elongated extensible boom adapted for mounting on a mobile harvesting vehicle. A tree engaging clamp is mounted on the forward end of the boom and an inertia shaker mechanism is mounted on the rearward end of the boom for reciprocating the boom longitudinally to dislodge fruit from a tree gripped by the clamp structure.

---

The instant invention relates to harvesting of tree crops. Particularly it relates to an inertia shaker suitable for use in harvesting fruits and nuts, and a shaker motor and a limb-clamping member therefor.

Mechanical fruit harvesting devices embodying tree shaker mechanisms are well known in the art. Nevertheless, improvements continue to be sought which are calculated to increase harvesting efficiency and minimize plant damage.

Devices of the class with which the instant invention concerns itself each comprise a projectable and shakable boom which is conventionally carried by a tractor or mobile body through an orchard and the like. The boom supports a tree-engaging member, such as a clamp, on its outermost end and is adapted to be shaken under the control of an operator. The clamp is adapted to transmit the shaking torque to a limb or the like, to cause therefrom its fruit or nuts to be severed or disconnected.

Heretofore various pads have been suggested for use with the tree-embracing clamps, but none have been successful in transmitting the full vibratory forces without damaging the tree bark.

The instant invention contemplates the use of "bouncing putty" to obviate this disadvantage. The principal property of this material that is necessary for this use is that the material will flow when a force is applied at a slow rate such as when the shaker jaws are clamped to the tree limb, but will resist flow, or acts as a rigid material when forces fluctuating at a rapid rate such as the shaker vibratory forces are transmitted through it. This means that there is little loss of tree limb displacement due to absorption of vibratory forces which might occur with other materials such as solid or foam rubber.

Bouncing putty is marketed by Dow Corning Corporation of Midland, Michigan. It is available as a series of compound numbers classified as to flow and rebound characteristics. It is a silicone polymer. A typical compound number which we may use is Dow Corning C-4551.

The technical description of this substance is that it is a non-Newtonian silicone fluid. Furthermore, it is of that class of non-Newtonian fluids known as dilatant fluids or inverted pseudoplastics. The apparent viscosity of these fluids increases instantaneously with increasing rate of shear. In a Newtonian fluid the rate of shear and the shear forces are proportional. In the case of these fluids the rate of shear above a certain rate is longer proportional to the applied force resulting in a tremendous increase in apparent viscosity.

Improvements are desired in the instant art in connection with overall boom profile and construction, to facilitate ready access to all tree limbs, to the end that time economy is maximized by curtailing the requirement for maneuvering a boom or its carrier in order to achieve access to fruit- or nut-bearing limbs to be harvested.

Additionally, improvements are required in tree- or limb-engaging members or gripping means carried on the outer ends of the booms, to minimize plant damage. In this latter regard, when it is considered that substantial jolting forces are applied to limbs to dislodge or disconnect therefrom fruit or nuts, the hazard of damage to engaged or gripped limbs becomes readily apparent. It is such hazard which it is desirable to minimize, as it constitutes a potential threat of economic loss which may be of shaker devices can be increased by increasing shaker However, with improved gripping means for holding limbs which are being harvested, greater shaker forces may be applied with impunity. That is, shaking efficiency of shaker devices can be increased by increasing shaker force. Shaker force, of course, is limited by considerations with respect to limb bruising, and, if means are provided for minimizing bruising under increased shaker force, such increased shaker force can be employed to increase harvesting efficiency inasmuch as by maximizing the shaker forces time economies during harvesting can be effected proportionally.

In accordance with the instant invention, and as a principal object thereof, there is provided an improved mechanism for harvesting of fruits and nuts and the like.

It is a further object of the instant invention to provide an improved inertia shaker construction adapted for employment in gathering of fruits and nuts and the like.

It is another object of the instant invention to provide jolting or shaking means for an inertia shaker improved over that which is conventionally available.

It is an additional object of the instant invention to provide an inertia shaker having a shaker motor with a pair of oppositely driven shafts on which there are mounted eccentric weights for jolting the boom in which the shaker motor is mounted.

It is a yet further object of the instant invention to provide an inertia shaker of the class described which is universally adjustable and has a profile adapted for ready penetration of tree foliage to thereby obtain access to limbs to be gripped by the clamped at the end of the shaker boom.

It is still a further object of the instant invention to provide an inertia tree shaker an improved limb-gripping clamp adapted to minimize plant bruising resulting from shaker torque, whereby shaker torque can be maximized.

Moreover, an object of the invention is the provision, in a limb-gripping clamp of an inertia shaker, of means which allow the clamp to conform to the curvature of and wrap itself about the limb to be harvested while it is being clamped but will resist deformation under impact of operative shaking or vibratory forces.

The foregoing and other objects, features and advantages of the present invention become more apparent upon consideration of the following description and appended claim, when considered in conjunction with the accompanying drawings wherein the same reference character or numeral refers to like or corresponding parts throughout the several views.

On the drawings:

FIG. 1 is a perspective view of a boom embodying the present invention, parts being broken away to minimize drawing area required.

FIG. 2 is a side elevational view of the shaker motor for said boom.

FIG. 3 is an end elevational view of said shaker motor looking at the left end of FIG. 2.

FIG. 4 is an enlarged sectional view through the shaker clamp mounted on the work end of said boom.

Referring now more particularly to FIG. 1, there is shown a boom generally designated as 11. Boom 11 comprises an elongated inner end or mounting section 12 which in the embodiment illustrated is square in cross section. The mounting section 12 is adapted for support by a mobile harvesting vehicle (not shown) on a universal-type mounting, such as a gimbals construction, relative to which the boom 11 may be rocked in any selected plane by an operator employing a pair of handlebars 13 which project outwardly from the innermost end portion 14 of said boom on which said handlebars are connected in any suitable manner. Adjacent the innermost end portion 14, the mounting section 12 of the boom is passaged between its opposite sides 15 and 16 to provide an opening in which a shaker motor generally designated 17 is mounted by means illustrated in FIG. 2 and which will be described presently.

A hydraulic ram comprising an elongated casing 18, which is rectangular in cross section and projected forwardly from the forward end of the mounting section 12 by which said casing 18 is carried, includes an elongated hydraulic ram rod 19 which is reciprocatively mounted in the casing 18. The ram rod 19 is projectable from the forward end of and telescopically retactable into the casing 18 by double-acting hydraulic means (not shown), the nature of which is understood in the art. The ram rod 19 comprises the major means by which the boom 11 is extended adjacent a limb to be harvested. Said ram rod 19, like the casing 18 in which said rod 19 is reciprocative, is square in cross section, as illustrated in FIG. 1.

While the squareness of the parts heretofore defined serves to strengthen the boom, also, such design provides a uniformly sleek profile for the boom by reason of which the same is capable of quick penetration through thick foliage, whereby time economies in positioning of the boom 11 can be effected.

To the end that a clamp generally designated as 20 can be secured upon a limb to be harvested once the boom 11 has been extended into harvesting position, a double-acting hydraulic cylinder 21 is operably mounted in a bore 62 defined in the outer end of the ram rod 19. Pneumatic means in cylinder 21 control a stem 22 which projects outwardly from said cylinder to selectively position what shall be referred to as the adjustable jaw 23 of the clamp 20. It is observed that the mounting section 12, the casing 18 and the rod 19 of the hydraulic ram, as well as the cylinder 21 and its stem 22, are in co-axial alignment with each other longitudinally of the longitudinal axis of boom 11, whereby efficient management of the movable jaw 23 is achieved. In addition to the movable jaw 23, the clamp 20 comprises a fixed jaw 24 which is spaced outwardly from the movable jaw 23 and carried on a bracket or fixed jaw extension 25 with which said fixed jaw 24 is illustrated in the instant embodiment as being integral.

The bracket or fixed jaw extension 25 comprises a pair of spaced apart, longitudinally extending axially offset connectors 26 and 27 which define a track for the jaw 23 a lower portion 65 of which is disposed between said connectors. Said connectors have a pair of inner end extensions 28 and 29, respectively, which extend from the ends of the connectors opposite the fixed jaw 24 angularly to the outer end portion of the rod 19 to which said end extensions 28 and 29 are rigidly secured. Thereby, a mouth 30 is formed between the fixed jaw 24 and the end extensions 28 and 29 limited by the offset connectors 26 and 27 in which the movable jaw 23 is adapted to reciprocate upon suitable movement of the stem 22. The connectors 26 and 27 are disposed parallel to each other, and, if they are considered as defining opposite sides of the boom, the extensions 28 and 29 may be considered as being connected to the underside 31 of said boom 11, whereby said clamp presents an exceedingly narrow profile, being narrower than the spacing between the sides 32 and 33 of the rod 19.

The fixed jaw 24 is disposed in operable or co-axial alignment with the movable jaw 23, and may be considered as comprising an angularly bent U-shaped member having a pair of opposite sides 34 and 35 which are co-extensive with the connectors 26 and 27 with which said sides 34 and 35 are integral, respectively. Additionally, the sides 34 and 35 can be described as being angularly bent about an axis extending transversely of the sides 34 and 35. Such configuration provides angularly disposed outer and inner fixed jaw parts 36 and 37, as illustrated in FIGS. 1 and 4, the inner jaw part 37 being defined by the parts of the sides 34 and 35 which are integral with the jaw connectors 26 and 27.

As clearly illustrated in FIG. 4, the fixed jaw 24, which may be a casting, comprises an angularly bent plate 38 which extends across the workward surface of the U-shaped members defining the sides 34 and 35. The angularly bent plate 38 is characterized by a pair of angularly disposed flats 39 and 40 which are recessed or countersunk to provide seats for a pair of limb-clamping pads or cushions 41 and 42 which are disposed in angular relationship with each other, conforming with the angular relationship of the flats 39 and 40, as illustrated in FIGS. 1 and 4. The means by which the pads or cushions 41 and 42 are secured in operatble position will be described hereinafter.

The movable jaw 23 may define a trough-like exterior structure having integral flared flanges 44 and an integral apertured flat base 43 which is disposed in a plane normal to the longitudinal axis of the boom 11. Jaw 23 defines a rectangular opening opposite said base 43 in which there is welded, as at 46, the peripheral portion of an angularly bent plate 45 comprising a pair of angularly disposed sections 47 and 48. The sections 47 and 48 have a pair of countersinks which may be circular in configuration and provide a pair of seats, respectively, for a pair of clamp pads or cushions 49 and 50 which are secured in said seats against the plates 47 and 48 in a manner which will be presently described. A plurality of gussets 51 suitably arranged with opposite ends bearing against facing surfaces of the base 43 and flange 44 of the movable jaw 23, and the bent plate 45, serve to rigidify the movable jaw 23, as illustrated in FIG. 4.

As illustrated in FIG. 4, the fore end portion 53 of the stem 22 is projected through an aperture 54 in the base 43 of the movable jaw into engagement with the central portion of apex of the angle into which the plate 45 is bent and to which apex said stem portion 53 is secured by any suitable means. Thereby, the movable jaw 23 is reciprocative with the stem 22, to the end that a fruit-bearing limb 55 can be releasably gripped between the pads 41 and 42 of the fixed jaw and the pads 49 and 50 of the movable jaw. In this latter connection, it is observed that the lines or axes along which the plates 38 and 45 are bent or angularly formed are co-axially aligned with the longitudinal axis of the boom 11, and that each of said plates 38 and 45 is bent at an angle which may be more than 90°. Furthermore, the limb-engaging surfaces of the pair of pads or cushions associated with each of the jaws 23 and 24 are disposed with respect to each other at an angle substantially the same as that formed by the apices of the respective plates 38 and 45.

The construction of each of the pads 41, 42, 49 and 50 in the embodiment herein illustrated is the same as that of each of the others, to which attention is now invited. Each of said cushions or pads may comprise a cylindrical section having an apertured flat circular base 56 which is seated in a respective one of the countersinks in the facing or work surfaces of the plates 38 and 45. Each pad or cushion is retained by a flat disc 57 which is disposed within its respective cushion and pulls a corresponding base 56 in its seat as a consequence of being drawn toward an asociated one of the plates 38 and 45 by a take-up nut 58. Each take-up nut 58 is mounted on the outer threaded end portion of a stem 59 which extends through the aperture in a respective one of the angular plate portions 39, 40, 47 and 48. The inner end portion of each of said stems 59 is rigidly connected to a corresponding disc 57 from which its stem is projected outwardly through the base 56 of its cushion, as illustrated in FIG. 4. As illustrated in FIGS. 1 and 4, access to the nuts 58 is gained because there is a space between the sides 34 and 35 of the fixed jaw by reason of the frame-like construction of the movable jaw 23.

The pads or cushions are defined by housings of flexible fabrication having chambers 52 therein, the fabric of the housings being tough and abrasion-resistant. The chambers 52 may be filled with air or other material such as silicone putty which imparts a characteristic to the pads or cushions which permits them to conform to the curvature of a limb 55, when in clamped position, but which resists deformation under the impact of shaking or shaker vibrations. The design of the pads or cushions is such that when they are filled with compressible material to an operable level and in non-gripping position, the gripping surfaces 60 of such pads are puffed out or dome-shaped. To the end that air may be used in the pad chambers 52, self-sealing valve ports 61 may be provided, as illustrated in pads 49 and 50 in FIG. 4, to provide for withdrawable entry into each port of a conventional air supply nozzle 62.

The foregoing clamp construction provides the means by which a limb to be harvested may be tightly gripped and vigorously shaken without damage from abrasion either to the limb or to the clamp or gripper pads 41, 42, 49 and 50. The construction also permits employment of shaker forces of a magnitude which are greater than those conventionally employed because of the minimization of the hazards attendant the use of such greater force when employing conventional devices. To maximize the effectiveness of such forces of greater magnitude, the shaker motor 17, the details of construction of which are shown in FIGS. 2 and 3, is employed. As illustrated, the shaker motor comprises a housing 68 having a central section 69 which is ported as at 70 for receiving hydraulic fluid. A mounting boss 71 is carried on or integral with the housing comprising said central section 69, and has bolt holes or the like 72 by means of which the boss 71 can be connected to the end fitting of a hydraulic fluid conduit for hydraulic operation of said motor 17. Disposed on opposite sides of said section 69 are a pair of opposed motor housing sections 73 and 74 from the sides of which a pair of oppositely driven motor output shafts 75 and 76 project in parallel relationship with each other with their axes of rotation being eccentric to the central housing section 69.

As illustrated in FIGS. 2 and 3, the motor 17 is rigidly secured to the boom 11 by means of bolts or equivalent fasteners 79. The fasteners 79 secure housing sections 73 and 74 to a pair of lower and upper mounting bosses or flanges 77 and 78, respectively. The flanges 77 and 78 are carried by a pair of structural parts 80 and 81 of the boom 11 to which said mounting flanges 77 and 78 may be fastened by welding, as at 82 in FIG. 2.

Each of the shafts 75 and 76 has rigidly secured on the outer end portion thereof an eccentric weight structure 83. Each of said weight structures 83 comprises an arcuate section of approximately 100°, having a peripheral weighted portion 84, a central anchoring or hub portion 85, and a connecting web portion 86. Each hub portion 85 mounts its associated weight structure 83 on a corresponding one of the shafts 75 and 76, and is retained from independent rotation by means of a spline 88. Each of the central portions 85 has a slot 87 communicatively connecting with its mounting aperture, whereby each hub or central portion 85 is divided into a pair of legs 89 and 90 disposed about and defining the keyway for an associated spline 88. To adjustably retain each weight structure 83 from any displacement longitudinally of its shaft, a clamp 91, comprising a bolt 92 and take-up nut 93, clamps the legs 89 and 90 tightly on the spline 88, as illustrated in FIG. 3.

Inasmuch as the shafts 75 and 76 are oppositely rotating, the weight structures 83 and 84 also will rotate in opposite directions, for example, as designated by the arrows 94 and 95 in FIG. 3. Such counterweighted rotations of eccentrically disposed shafts 75 and 76 will impart a shaking force to the boom 11 of great magnitude and highly efficient character.

As many substitutions or changes could be made in the above described construction, and as many apparently widely different embodiments of the invention within the scope of the claim could be constructed without departing from the scope and spirit thereof, it is intended that all matter contained in the accompanying specification shall be interpreted as being illustrative and not in a limiing sense.

What is claimed is:

1. In a tree shaker, the combination of an elongated boom having opposite ends arranged in fore-and-aft relationship, with a tree gripping clamp having padded opposable jaws and mounted on the forward end portion of said boom, and a shaker means mounted in the aft end portion of said boom defining a pair of rotatable opposed weighted eccentrics, said shaker means including a motor having a pair of parallel shafts extending oppositely from each other and transversely of the longitudinal axis of said boom, said weighted eccentrics being adjustably mounted on said shafts.

References Cited

UNITED STATES PATENTS

| 1,517,587 | 12/1924 | Roth | 74—61 |
|---|---|---|---|
| 2,389,933 | 11/1945 | Rober | 81—166 X |
| 2,804,743 | 9/1957 | Gould et al. | 56—328 |
| 3,120,091 | 2/1964 | Gould et al. | 56—328 |
| 3,132,458 | 5/1964 | Russell et al. | 56—328 |
| 3,206,919 | 9/1965 | Read | 56—328 |
| 3,220,268 | 11/1965 | Brandt | 74—87 |
| 3,335,556 | 8/1967 | Edgemond | 56—328 |
| 2,748,608 | 6/1956 | Riley | 74—61 |
| 3,225,529 | 12/1965 | King | 56—328 |
| 3,339,422 | 9/1967 | Petrin | 74—87 |

F. BARRY SHAY, Primary Examiner

P. A. RAZZANO, Assistant Examiner

U.S. Cl. X.R.

74—87